(12) United States Patent
Alvin et al.

(10) Patent No.: US 6,468,322 B1
(45) Date of Patent: Oct. 22, 2002

(54) FILTER HOLDER ASSEMBLY HAVING EXTENDED COLLAR SPACER RING

(75) Inventors: Mary Anne Alvin, Pittsburgh; Gerald J. Bruck, Murrysville, both of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/676,341

(22) Filed: Sep. 29, 2000

(51) Int. Cl.[7] .......................... B01D 29/15; B01D 35/14
(52) U.S. Cl. .............................. 55/482; 55/502; 55/508; 55/523
(58) Field of Search ........................ 55/341.1, 502, 55/508, 482, 523

(56) References Cited

U.S. PATENT DOCUMENTS

| 5,401,406 | A | * | 3/1995 | Johnson et al. .......... 210/323.2 |
| 5,433,771 | A | | 7/1995 | Bachovchin et al. |
| 5,876,471 | A | | 3/1999 | Lippert et al. |
| 5,944,859 | A | | 8/1999 | Lippert et al. |

* cited by examiner

Primary Examiner—Robert A. Hopkins
(74) Attorney, Agent, or Firm—Eckert Seamans Cherin & Mellott, LLC

(57) ABSTRACT

A filter holder assembly is provided that utilizes a fail-safe regenerator unit with an annular spacer ring having an extended metal collar for containment and positioning of a compliant ceramic gasket used in the assembly. The filter holder assembly is disclosed for use with advanced composite, filament wound, and metal candle filters.

7 Claims, 5 Drawing Sheets

FILTER HOLDER ASSEMBLY HAVING EXTENDED COLLAR SPACER RING

CROSS-REFERENCE TO RELATED APPLICATION

The present application relates to a U.S. patent application Ser. No. 09/676,342, filed on Sep. 29, 2000, entitled "FILTER HOLDER GASKET ASSEMBLY FOR ENHANCED SECUREMENT OF CANDLE FILTERS" to Bruck et al.

The Government of the United States of America has rights in this invention pursuant to Contract No. DE-AC21-94MC31147, awarded by the United States Department of Energy.

FIELD OF THE INVENTION

The present invention relates generally to hot-gas cleanup systems and more particularly to filter holder and gasket assemblies that provide particulate barrier seals between the body of a candle filter element and the filter holder when coupled to a hot gas cleanup system support plate.

BACKGROUND OF THE INVENTION

Modern industrial methods have resulted in a need for devices and systems that are capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. Examples of such filtering apparatus and systems can be found in U.S. Pat. Nos. 5,433,771 and 5,876,471.

Currently, various assemblies of commercially available candle filters are employed for application within hot gas filtration systems. For example, in co-pending application Ser. No. 09/393,561, filed Sep. 10, 1999 (Docket No. 99E7659), entitled "FILTER ASSEMBLY FOR METALLIC AND INTERMETALLIC TUBE FILTERS", to Alvin, et al., there is taught the use of an integral metal filter failsafe-regenerator assembly; and in co-pending application Ser. No. 09/602,214, filed Jun. 23, 2000 (Docket No. 99E9210), entitled "MULTIPURPOSE SINGLE EXTERNAL SEAL FILTER ASSEMBLY FOR METALLIC AND CERAMIC TUBE FILTERS WITH INTEGRAL LOCKING MEANS", to Alvin et al, there is taught the use of a single compression fit gasket for integral metal filter faisafe-regenerator assemblies.

With the development of advanced materials, the geometry of the candles has varied, particularly in the flange region, requiring modification to the fixturing and sealing arrangements for the individual elements within the filter housing, in order to provide an effective particulate barrier seal during use in high temperature applications for each candle configuration. Employing separate filter holder designs for each candle filter configuration adds considerable expense to such systems and is inefficient.

Accordingly, a new filter holder assembly design is desired that will securely mount candle filter elements with a wide variety of variably sized flange geometries, within existing hot gas filtration systems. Furthermore, such an improved filter holder is desired that can be effectively employed in high temperature, high pressure, oxidizing, as well as reducing gas process environments.

SUMMARY OF THE INVENTION

The present invention discloses a filter holder assembly for holding a candle filter element within a hot gas cleanup system pressure vessel. The filter holder assembly includes a filter housing with a peripheral sidewall defining an interior chamber therein. A generally annular spacer ring is provided in the assembly and is positioned within the interior chamber. The assembly of the present invention further includes at least one top compliant gasket separate and apart from the filter housing. This top compliant gasket is preferably positioned on a candle filter flange end top surface for providing a seal between the spacer ring and the filter flange top surface. In addition, the top gasket is positioned generally adjacent to the collar of the spacer ring.

The assembly of the present invention further includes a collar that extends axially from the spacer ring and forms a stepped portion between the collar and the outside diameter of the spacer ring. In the present invention, this stepped portion permits the top gasket to seat against the spacer ring during filtering or back-pulsing, thereby resisting disruption of gasketing that can compromise the filtering effectiveness of the filter holder assembly.

DETAILED DESCRIPTION OF THE EMBODIMENTS

Figure 1:
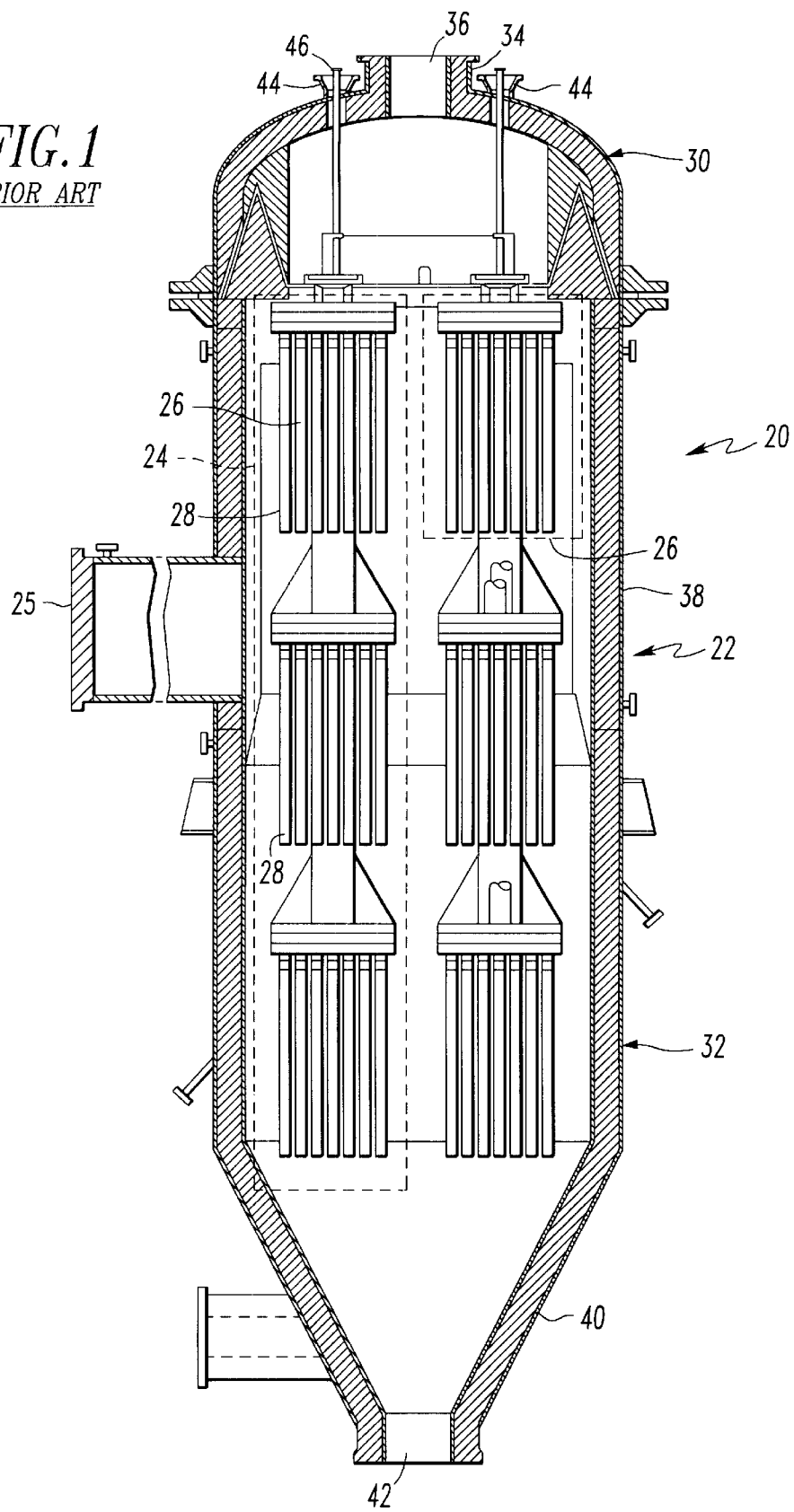
FIG. 1 is a longitudinal, sectional view of a pressure vessel incorporating a filter assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of filter elements 28.

The pressure vessel 22 has a dome-shaped head 30 and a body 32. The dome-shaped head 30 terminates in a linear tip 34, defining an exit opening or nozzle 36 for the filtered gas to be removed from the vessel 22. While the exit is shown at the top, it may also be at the side of the head 30 for ease of attachment of auxiliary components. The body 32 includes a dirty gas inlet 25, where gas containing particulates enters at a temperature of from about 1110° F. (600° C.) to about 1830° F. (1000° C.) and also usually contains about 2 vol. % to 25 vol. % water vapor in the form of steam, 200 ppmv to 0.5 vol. % sulfur in the form of $SO_3$, $SO_2$, $H_2S$ and other components such as C, chloride, alkali, and the like. The body also contains an upper part 38 having a generally circular cylindrical shape joined by a frustoconical ash hopper 40 for receiving the particulate matter terminating in a linear tip defining an opening or nozzle 42 connected to an ash discharge line. A plurality of ports 44 extend from the dome-shaped head 30. The ports 44 provide a site for inserting instrumentation and for viewing the interior of the dome-shaped head 30 during shutdown periods. Through each port, tubes 46 for supplying a backpulse burst of gas for cleaning the filters 28 can be placed.

Figure 2:
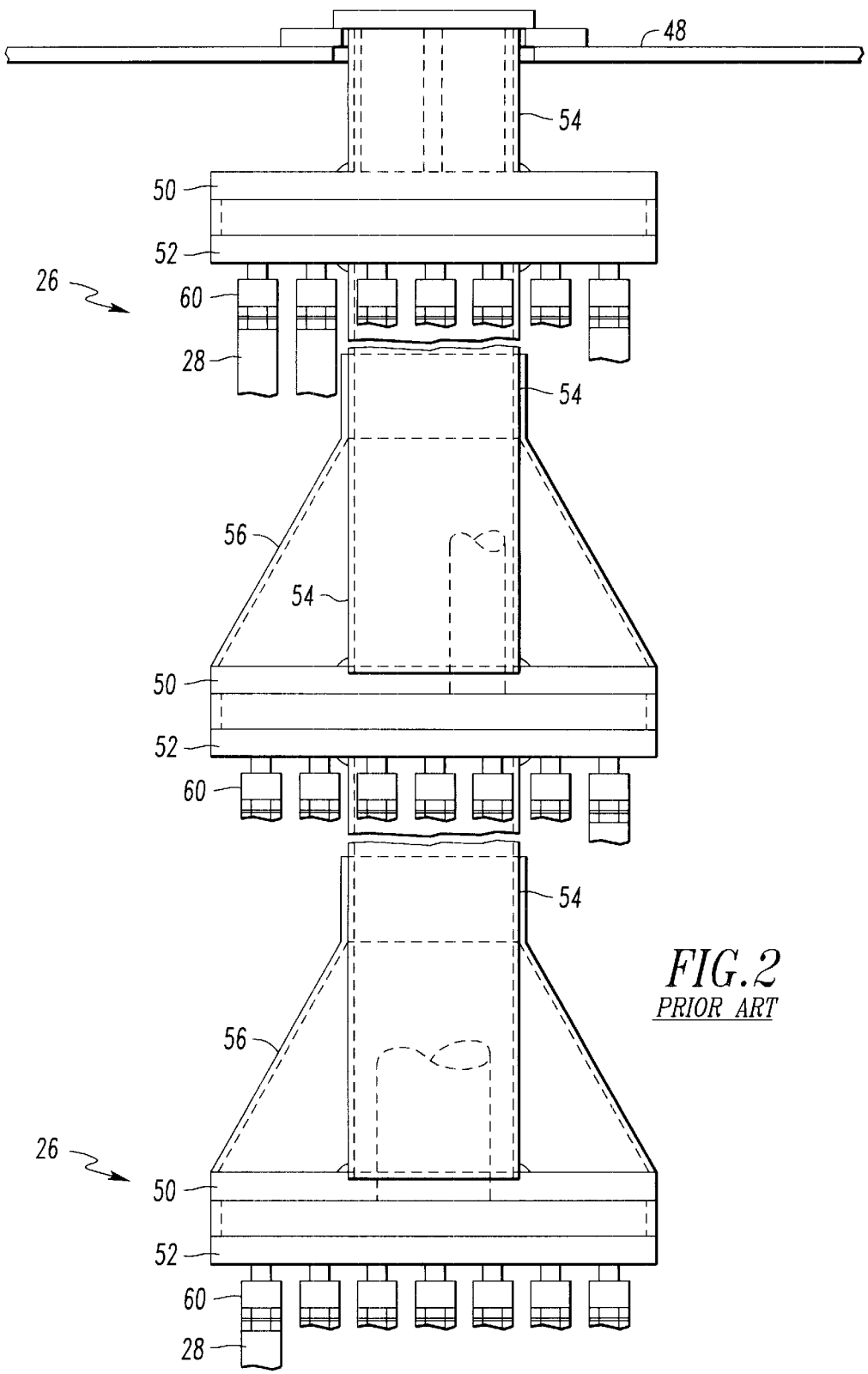
FIG. 2 is a side, elevational view of an array of filter assemblies, including filter elements, coupled to a tube sheet as shown in FIG. 1.

Referring to FIG. 2, the pressure vessel includes a tube sheet 48. The tube sheet 48 supports the plurality of filter element arrays 26. Each filter element array 26 comprises a manifold plenum consisting of an upper plate 50 and a lower plate 52 and side plate. In accordance with the present invention, each filter element 28 is held by a filter assembly 60 and coupled to the corresponding lower plate 52 of the manifold plenum. The filter assemblies 60 are integrated into a structural unit by plenum support pipes 54. Each plenum support pipe 54 is secured centrally within the pressure vessel 22. A dust shed or particle-deflector 56 having a generally frustoconical shape is also shown.

Figure 3:
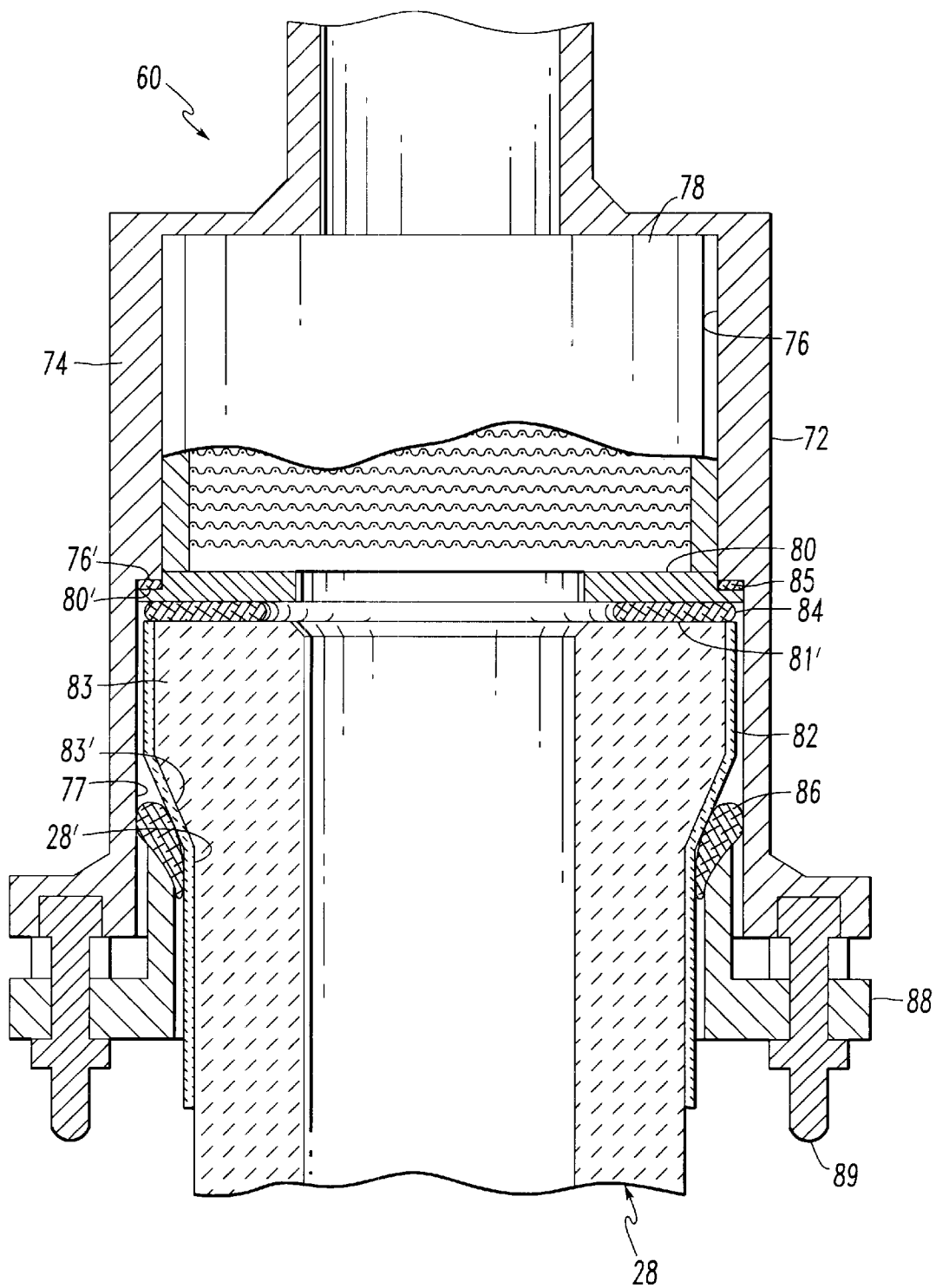
FIG. 3 is a sectional view of a filter holder and gasket assembly employing a non-collared annular spacer ring.

Referring now to FIG. 3, a single filter holder and gasket assembly 60 is shown in assembled form. The filter holder and gasket assembly 60 comprises a filter holder 72 having a peripheral sidewall 74 which defines an interior chamber 76. A fail-safe regenerator device 78 is positioned within the interior chamber 76, and an annular spacer ring 80 is mounted within the interior chamber 76. The assembly 60 also includes a sock or sleeve 82, a top compliant gasket 84, a middle compliant gasket 86, an additional compliant primary gasket 85 and a cast clamp 88. It is noted that the fail-safe regenerator device 78 is preferably, but not necessarily, a part of the assembly. The spacer ring 80 is positioned adjacent to and/or in contact with the compliant primary gasket 85.

Referring again to FIG. 3, in one embodiment of the invention shown, the spacer ring 80 is permanently mounted to the fail-safe regenerator to produce a single unit that is placed within the interior chamber 76 of the filter holder and gasket assembly 60. While this arrangement makes assembly more convenient, one skilled in the art will readily appreciate that the spacer ring 80 and fail-safe regenerator 78 can be assembled as two separable components. In the embodiment illustrated, the spacer ring 80 may be welded in abutment with the fail-safe regenerator device 78 to provide a means for positioning the fail-safe regenerator unit 78 in the interior chamber 76. So positioned, the top gasket 84 is compressed between the bottom of the spacer ring 80 and the top surface 81' of a candle filter flange 83; and the compliant primary gasket 85 is compressed between the top section of the spacer ring 80' and the stepped section of the interior chamber 76'. When assembled with cast clamp 88 and bolt 89 the filter element 28 resists moving and contacting the inner surface of the filter holder 77, thereby preventing possible damage to the filter element 28.

The fail-safe regenerator device 78 is provided to prevent particulate matter from traveling into the clean gas area of the pressure vessel if a filter element or gasket fails, is damaged or breaks. Additionally, the fail-safe regenerator 78 will heat the backpulse gas, which is generally cooler than the gas stream coming from the combustion or gasification process gas stream, minimizing thermal fatigue, cracking and/or failure of the filter element 28.

Referring again to FIG. 3, the filter holder 72, annular spacer ring 80, and fail-safe regenerator device 78 are made of a material that can withstand the relatively high temperatures that are reached in a particular system and possess the strength and durability to support the filtering components, preferably a high temperature metal material, such as 310S stainless steel.

Referring again to FIG. 3, the gaskets and cushions 82, 84, 85 and 86 are individual components that are separate and apart from the filter holder 72. These components are preferably made from high temperature ceramic fibers that are woven or braided into a desired pattern or shape, such as an annular gasket or circular sleeve. The shape and size of each component must be large enough to be positioned on or around the candle filter 28 to provide an adequate particulate barrier seal to resist gas leakage. More particularly, the sleeve or sock 82 is preferably made of a woven or braided oxide fabric. The top gasket 84 and middle gasket 86 can be made of a braided or woven oxide based fabric that encases an oxide fiber, intermeshed, compliant mat, or of a lapped or rolled woven or braided configuration.

Referring again to FIG. 3, the sock or sleeve 82 is positioned around the outer surface of a filter flange 83 of the candle filter element 28 to prevent contact of the filter element 28 and/or filter flange 83 with the interior surface of the metal filter housing 77. The top compliant gasket 84 is positioned along the top surface 81' of the filter flange 83 to provide a compliant cushion and particulate matter barrier seal between the spacer ring 80 and filter flange top surface 81'. The middle compliant gasket 86 is positioned at the base of the filter flange 83 over the sock or sleeve 82. The middle compliant gasket 86 provides a cushion between the lower section of the filter flange 83', the upper section of the filter body 28' and the cast clamp 88. The gasket 85 is positioned around the spacer ring. When the gasket 85 is compressed by the cast clamp ring 88, a primary particulate barrier seal can be formed. The assembled filter holder and gasket assembly 60 can then be coupled to the rest of the combustion assembly.

Figure 4:
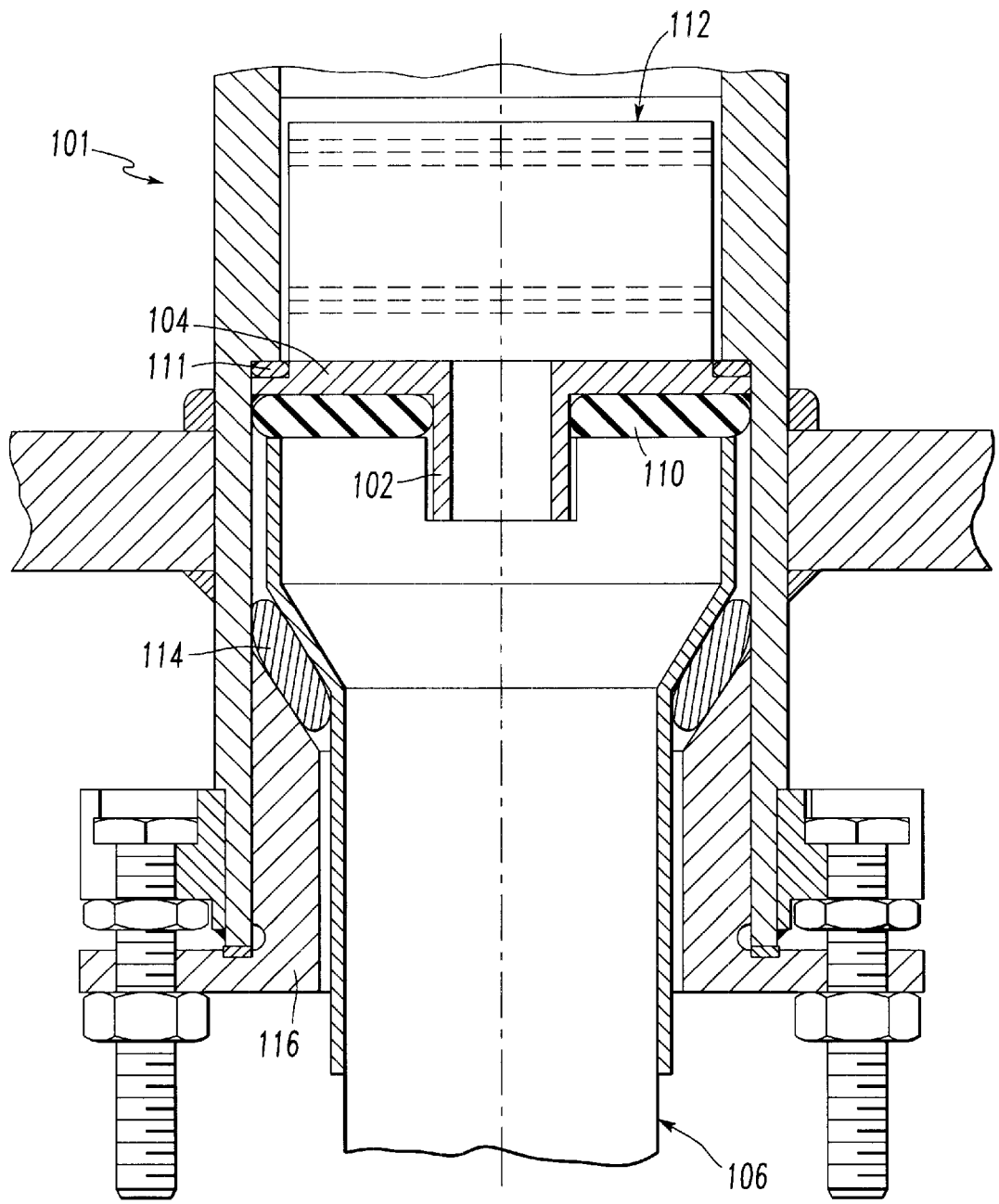
FIG. 4 is a sectional view of a filter holder and gasket assembly depicting an embodiment in accordance with the present invention.

Referring now to FIG. 4, in the form of the present invention shown, there is disclosed an assembly 101 for securing the position of the mat-filled complaint ceramic gasket seals during use of candle filter elements in hot gas filter system applications. This assembly 101 includes an extended metal collar 102 as either an integral or separately connected part of an annular spacer ring 104 that is positioned above a candle filter element 106. The extended collar 102 is positioned along the inside diameter of the spacer ring 104. The dimensions of the extended metal collar 102 are provided such that it can extend axially into the inside diameter bore of the candle filter 106, preferably such extension distance is approximately 10–mm. The extended metal collar 102 is also structured such that an approximately 1-mm gap results between itself and the inside diameter of the candle filter element 106. Preferably, the annular spacer ring 104 with extended metal collar 102 is joined to the failsafe-regenerator 112, forming an integral unit to facilitate installation within the filter holder assembly 101.

Referring again to FIG. 4, a top or mat-filled compliant ceramic gasket 110 is positioned along the outer surface of the extended metal collar 102 of the annular spacer ring 104 as shown. The gasket 110 seats against the annular spacer ring 104, which serves as the base for a fail-safe regenerator unit 112. In this manner, the extended metal collar 102 protects the top gasket 110 from contact with pulse cleaning gas and dislocation during a filter process operation, as well as during back pulse cleaning. As a result, the top gasket 110 remains properly positioned during operation of the hot gas filter system; maintains alignment of the fail-safe regenerator unit 112 within the filter housing, the primary compliant gasket 111, the candle filter element 106, the middle compliant gasket 114, and a cast metal clamp 116; and, resists passage of fines from the process gas stream into the cleaned gas passage of the filter assembly 101.

Figure 5:
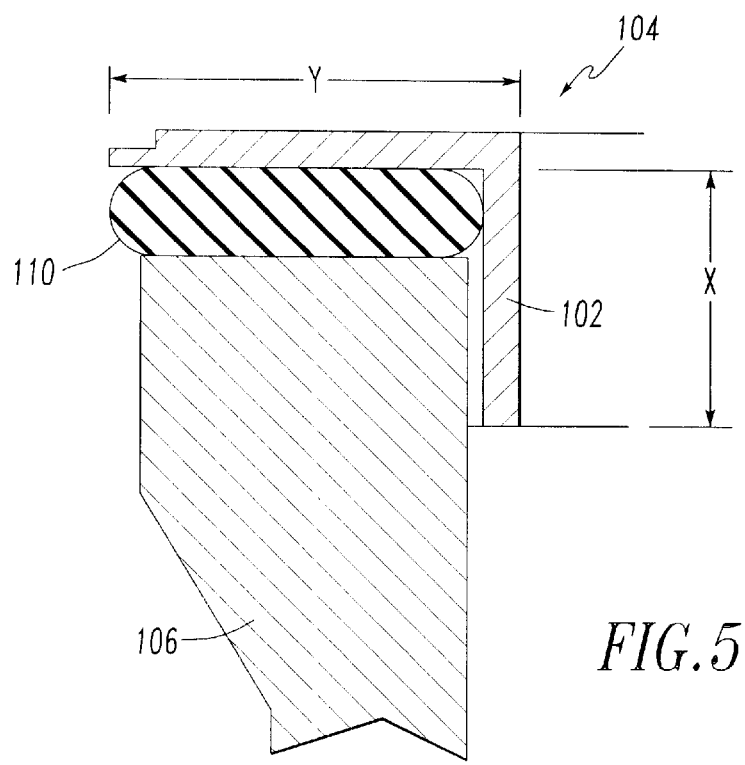
FIG. 5 is an enlarged, sectional view of a portion of the filter holder and gasket assembly of FIG. 4.

Referring now to FIG. 5, in the form of the invention shown, the extended metal collar 102 of the annular spacer ring 104 can be represented as having dimensions x and y. A properly selected y dimension, for example, can be effective in providing the annular spacer ring 104 with the capability to secure and retain the position of a gasket such as gasket 110 as shown, along the top surface of the candle filter 106 within the filter assembly. It is important to note that the design of the spacer ring 104 provides a relatively simple geometry that, with respect to manufacturability considerations, does not require extensive machining to form. The substantially L-shaped cross-section of the spacer ring 104, for example, eliminates the need for forming relatively complex geometries by excessive machining of components.

Table 1 provides examples of preferred x and y dimensions for candle filter elements with variably sized flange configurations.

TABLE I

| Candle | x,mm | y,mm |
| --- | --- | --- |
| DuPont PRD-66 | 10 to 12 | 20.5 |
| McDermott CFCC | 10 to 12 | 19 |
| Techniweave CFCC | 10 to 12 | 16.5 |

It can therefore be appreciated that the appropriate dimensions can be selected for a given candle filter element to promote securement and retention of the top compliant gasket 110, shown in FIGS. 4 and 5, within the candle filter system.

The extended collar of the present invention therefore provides the benefits of: (i) proper positioning and retention of the top compliant gasket 110, shown in FIGS. 4 and 5, during filter operation; (ii) aligning the candle element properly within the metal filter housing; (iii) resisting passage of fines into the clean gas passage of the filter system; and (iv) mitigating catastrophic failure of the filter elements and release of particulates to a turbine, for example.

It can be appreciated that the extended collar of the present invention can also be applied to a broad range of filter elements with variable flange geometries and configurations. It can be further appreciated that the dimensions of the collar can be adjusted to accommodate both commercially available, conventional filter elements as well as "non-standard" or developmental candle filter elements. In a preferred embodiment of the present invention, the outside diameter along the axial extension of the extended collar is dimensioned to provide a gap between this outside diameter and the inside diameter of a given candle filter element flange.

Figure 6:
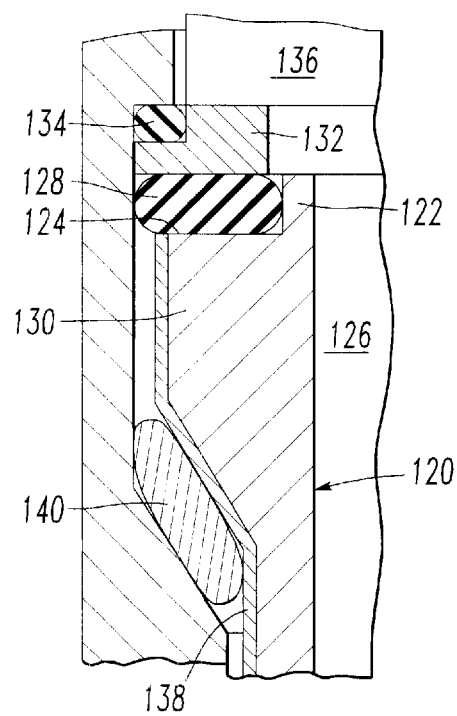
FIG. 6 is a sectional view of a portion of a filter holder, candle filter and gasket assembly illustrating an alternate embodiment of this invention.

The present invention may be embodied in other forms without departing from the spirit or essential attributes thereof. For example the alternate embodiment illustrated in FIG. 6 can be employed, particularly for metal, intermetallic, and superalloy porous filter elements. In this embodiment an annular, axial extension 122 is formed during manufacture of the filter element 120 along the flange surface 124 proximate the bore 126 of the filter element. The raised section 122 thus captures the top compliant gasket 128 between the top surface 124 of the flange 130 and the now recessed annular spacer ring 132. The arrangements of the primary compliant gasket 134, fail-safe regenerator 136, sleeve 138, middle compliant gasket 140, cast clamp/bolts (shown in FIG. 4) would all remain as previously described. Accordingly, reference should be made to the appended claims, rather than to the foregoing specification, as indicating the scope of the invention.

What is claimed is:

1. A filter holder assembly, for use within a hot gas cleanup system pressure vessel, for holding a candle filter element having a flange extending radially outward from a central bore, which forms a gas passage, comprising:

a. a filter housing, said filter housing having a peripheral sidewall, said sidewall defining an interior chamber;

b. a generally annular spacer ring having an inside diameter and an outside diameter, said spacer ring being positioned within said interior chamber;

c. a raised annular wall formed on said flange proximate to said bore, forming a collar; and d. at least one top compliant gasket separate and apart from said filter housing, said top compliant gasket being structured to be positioned on said candle filter element flange to seat adjacent said collar between said flange and said spacer ring.

2. The assembly of claim 1, further comprising a fail-safe regenerator device positioned within said housing interior.

3. The assembly of claim 2, wherein said fail-safe regenerator device is removably mounted above said spacer ring within said housing interior.

4. The assembly of claim 2, wherein said fail-safe regenerator device and said spacer ring are securely mounted together to form a single unit.

5. The assembly of claim 1, wherein the collar is formed as an integral part of the candle filter flange.

6. The assembly of claim 5, wherein the collar has an outside diameter that is smaller than the inside diameter of said spacer ring.

7. The assembly of claim 1, wherein said spacer ring has a peripheral notch along the outside diameter on a side of said spacer ring opposite a second side of said spacer ring designed to be positioned adjacent said top compliant gasket.

* * * * *